United States Patent [19]

Stern

[11] Patent Number: 4,793,761
[45] Date of Patent: Dec. 27, 1988

[54] RAPID AUTOMATIC SLIDE RETRIEVAL DEVICE

[76] Inventor: Helman I. Stern, 1120 Monterey Ave., Berkeley, Calif. 94707

[21] Appl. No.: 23,141

[22] Filed: Mar. 9, 1987

[51] Int. Cl.[4] .............................................. B65G 1/10
[52] U.S. Cl. .................................. 414/331; 414/263; 221/82
[58] Field of Search .......................... 221/82, 83, 76; 414/331, 263, 266, 267

[56] References Cited

U.S. PATENT DOCUMENTS

| | | | |
|---|---|---|---|
| 3,168,958 | 2/1965 | Grossi | 414/416 |
| 3,659,837 | 5/1972 | Umahashi | 221/81 XR |
| 3,727,794 | 4/1973 | Di Eranco | 221/82 XR |

FOREIGN PATENT DOCUMENTS

| | | | |
|---|---|---|---|
| 2388741 | 12/1978 | France | 414/281 |
| 186808 | 10/1984 | Japan | 414/331 |
| 82509 | 5/1985 | Japan | 414/331 |
| 262702 | 12/1985 | Japan | 414/331 |

*Primary Examiner*—Frank E. Werner
*Attorney, Agent, or Firm*—Charles H. Schwartz; Ellsworth R. Roston

[57] ABSTRACT

An apparatus for storage and radial discharge of selected like items, including, a rotary storage device for storing a plurality of the selected like items at individual radial positions. Rotation of the storage device provides for positioning of individual ones of the stored items for ejection of individual ones of the stored items outwardly. A plurality of retainers are coupled to the stored items. Each retainer includes a first position to retain a stored item and a second position to release a stored items for ejection. A retrieval mechanism triggers individual ones of the retainer means to release individual ones of the stored items. A catcher interupts the ejected items along a substantially horizontal path and directs the caught items along a substantially vertical path into a collector device. A controller is responsive to the location of individual ones of the stored items to control the retrieval mechanism to trigger the proper retainer to allow the desired item to be released and ejected.

9 Claims, 3 Drawing Sheets

RAPID AUTOMATIC SLIDE RETRIEVAL DEVICE

BACKGROUND OF THE INVENTION

1. Field of the Invention

This invention relates to a slide storage unit or the like and an automatic device to facilitate slide retrieval in a rapid and sequential manner.

2. Description of the Prior Art

Heretofore, owners of large slide archives stored their collections in slide boxes or plastic sheets placed in notebook holders or mounted vertically on holding devices. Those slides had to be manually placed in a standard slide exchanger for use in a slide projector. The manual finding and retrieving of the slides was very time consuming.

The prior art slide exchangers or slide holders with automatic removal are designed for holders with a limited number of slots for storing slides. A single slide is removed, viewed and returned to its original position in the slide holder before a second slide can be removed. Removal of a second slide requires the slide holder to be repositioned in a linear movement, for box-like slide holders or in a circular movement for carousel type holders. The extraction, replacement and repositioning movements are all achieved through time consumming electro-mechanical devices.

Prior art automatic carousel storage and retrieval systems for objects of like size, shape and eight of slides depend on the mechanical rotation of a carousel to move the proper item in front of a picking location. The carousel is stepped to the picking location and the desired item is extracted or ejected. The extraction or ejection may be by a mechanical device or by a magnetic force wherein the retrieved item is composed of or attached to a magnetically sensitive material. Alternatively, such automatic carousel storage and retrieval systems require the extraction device to be revolved about a stationary carousel. Upon positioning of the extraction device opposite the desired item, the extraction device proceeds to stop and extract or wait for ejection of the item.

Most users of large slide collections would find it desirable to have a device which can quickly search for, locate and physically retrieve a group of designated slides.

SUMMARY OF THE INVENTION

It is the object of this invention to provide a quick multi-slide retrieval device for use in conjunction with a slide management and archiving system wherein a large collection of slides are physically stored in locations referencable by a computerized data base system. Such systems are required by museums and art schools which periodically need to retrieve sets of slides for particular events such as lectures and the like. Teachers, lecturers, salesman and private individuals with large collections of slides may also benefit from this invention.

A further advantage of the present invention is to augment a computer search of a slide data base wherein the computer stored locations of all slides matching a desired category (for example, all oil paintings, by French artists, during the years 1800–1890, containing red apples) are accessed for rapid physical retrieval. In lieu of a manual time consuming process of searching through storage devices, such as slide boxes or slide notebook holders, the object of my invention allows a predefined group of slides to be retrieved automatically.

In order to accomplish these results, my invention contemplates that individual slides be stored in radial slots forming carousel units which are mounted one on top of each other to form one physically rigid cylinder capable of being rotated about a vertical axis. Unlike conventional slide holders used in slide projectors this arrangement has the advantage of being able to accommodate an unlimited number of slides within a reasonable size structure.

In contrast to devices that require physical contact with the object to be retrieved using manual, mechanical or magnetic extraction or ejection, my invention requires no modification of the object and uses centrifugal force created by high speed rotation of the carousel-cylinder assembly to propel the object from its container.

A further advantage of my invention is that this centrifugal force can also be utilized to secure unselected slides from becoming dislodged.

A further object of my invention is to capitalize on the rapid discharge of selected slides through centrifugal force by continuing the high speed rotation of the entire carousel-cylinder assembly until the next slide is in the proper position. This is unlike other storage and retrieval devices that require the entire storage assembly to come to a complete stop before an object can be removed.

The resultant effect is that the required set of slides are rapidly propelled in sequence whereby their horizontal path is interrupted by a catcher which stops their lateral motion and allows the slides to free-fall. The slides may then be guided by the sides of the catcher into a collection receptacle. An advantage of this scheme is that the collection receptacle can be of the standard type readily used in commercially available slide projectors.

A further object of my invention is that the detection and timely release of the proper slides are performed by optic-electronic-magnetic means so as to be commensurate with the rapid discharge speed induced by centrifugal force, and thus not requiring the slowing down or stopping of the high speed rotation of the carousel-cylinder assembly.

A further object of my invention is the illumination of the plastic slot dividers by a single light source allowing the slot positions to be detected by a passive optical detector as they pass in front of the release point. This allows the radial position of the slots to be counted and quickly compared to the desired radial position by digital electronic means.

BRIEF DESCRIPTION OF THE DRAWINGS

A clearer understanding of the present invention will be had with reference to the following description and drawings wherein.

DESCRIPTION OF THE PREFERRED EMBODIMENTS

Figures 1, 2, 3, 4:
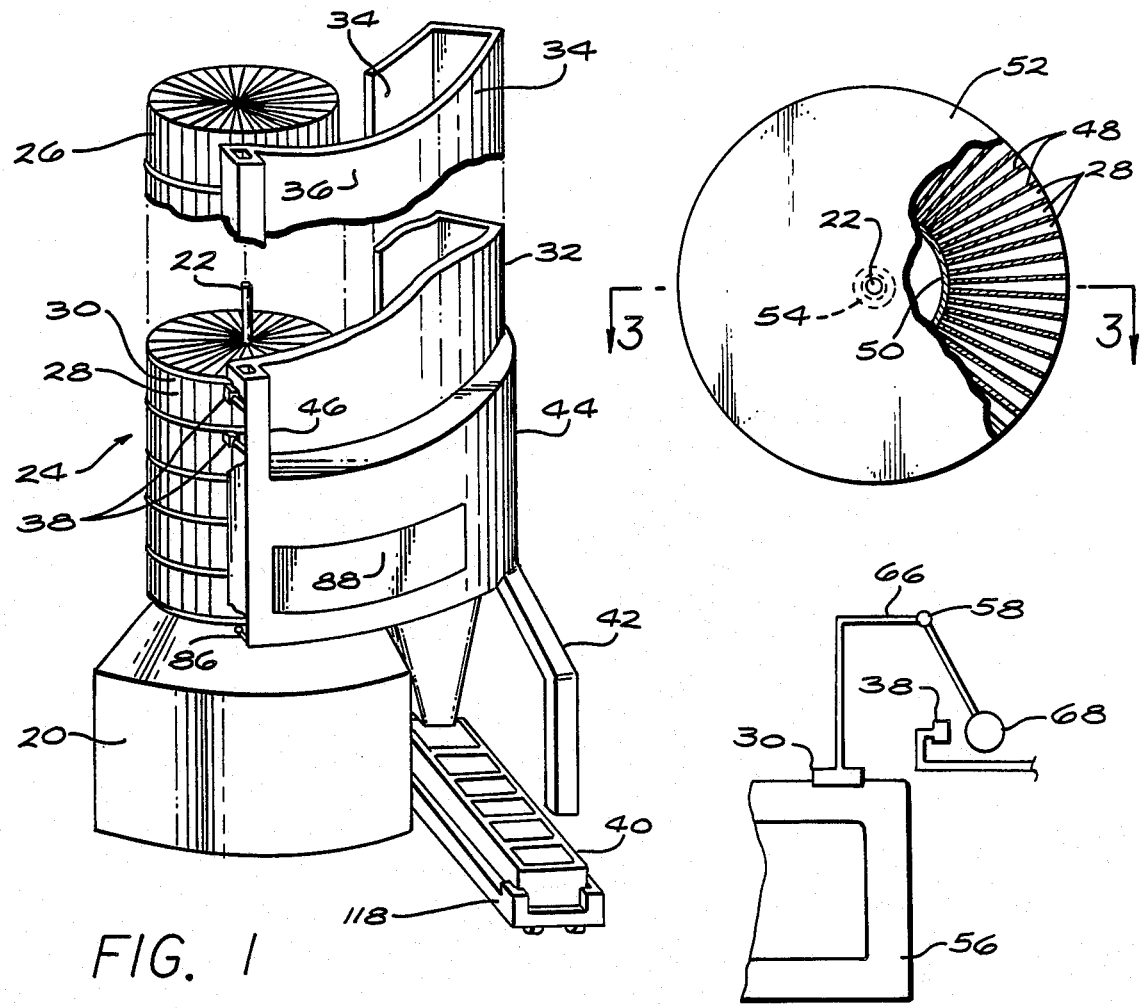
FIG. 1 shows an elevated perspective view of an assembled embodiment of my invention.
FIG. 2 shows the top view of a single carousel slide storage unit taken along line 2—2 of FIG. 3.
FIG. 3 shows a cross-sectional view of a single carousel unit along the line 3—3 of FIG. 2.
FIG. 4 shows a side view of an alternate slide retainer apparatus.

Drawing Reference Numerals 20 motor housing
22 motor shaft
24 carousel-cylinder assembly
26 individual carousel slide storage unit
28 slide storage slot
30 slide retainer apparatus
32 slide catcher unit
34 tapered side of catcher
36 extended catcher side
38 electromagnet activator
40 slide collector receptacle
42 catcher support legs
44 horizontal collar housing
46 hollow verticle tube
48 separator
50 perforated cylinder
52 disk
54 mounting bracket
56 slide
58 pin
60 spring
62 metal plate
64 retainer stop
66 alternative slide retainer apparatus
68 metal ball
70 face of retainer 30
72 horizontal path
74 downward path
76 light beam
78 light source
80 opticle detector
82 light source
84 light beam
86 opticle detector
88 printed circuit card
90 relay
92 AND gate circuits
94 comparator circuit
96 counter circuit
98 delay circuit
100 microcomputer
102 desired radial position signal
104 desired tier position signal
106 radial position pulses
108 measured radial address
110 match signal
112 relay trigger pulse
114 verify pulse signal
116 delayed verify pulse signal
118 collector receptacle mover FIG. 1 shows an elevated perspective of an assembled embodiment of my invention. The invention comprises a housing 20, containing a motor (not shown) whose shaft 22 is attached to a carousel-cylinder assembly 24. The carousel assembly is comprised of a number of vertically tiered carousel slide storage units 26. Mounted above each slide storage slot is a slide retainer apparatus 30 shown in FIG. 3. Located next to the carousel-cylinder assembly 24, but disconnected except at the base, is a slide catcher unit 32 comprised of two tapered sides 34 one of which 36 is extended around the body of the carousel assembly to hold an electromagnet 38 (shown in FIG. 3) at each tier. Beneath the tapered portion of the slide catcher is room for a removable slide collector receptacle 40. The collector receptacle is capable of being repositioned by a collector receptacle mover 118 driven by the motor inside the housing 20. Legs 42 supporting the catcher are located on one side of the movable slide collector. A horizontal hollow collar housing 44 is attached to the catcher 32 to protect electronic devices including a printed circuit card 88. This collar wraps around until it joins with a hollow vertical tube 46 which houses electric wiring, an optical detector 86 and the electromagnetic activators 38 located at each tier opposite the top of each of the carousel slide storage units 26.

FIG. 2 shows a top view of a single carousel slide storage unit taken along line 2—2 of FIG. 3. Separators 48 are located radially to create evenly spaced slots 28 for the storage of slides. The slots are open to the outward exterior of the carousel to allow the slides to be removed, but are closed by a cylinder 50 on the inner side of the carousel. The carousel is closed at the top and bottom by two disks 52 each containing a hole through which the motor shaft 22 passes. The carousel is secured to the motor shaft by means of a mounting bracket 54.

Referring to FIG. 3 a cross-sectional view of a single carousel slide storage unit 26 is shown containing a slide 56. Associated with each slot is the slide retainer apparatus 30 secured between two separators by a pin 58 which is in the shape of a ring as it threads its way through all slots in the carousel. A spring 60 applies pressure through the retainer 30 to secure the slide in its slot. The top of each retainer 30 contains a small metal plate 62 tightly secured to its body. A single electromagnetic activator 38 is shown positioned over the plate 62. Above each retainer 30 is a retainer stop 64 secured to the upper disk 52.

FIG. 4 is a drawing of an alternative slide retainer apparatus 66 formed as a pivoting link around the pin 58 whose function is to translate gravitational and centrifugal force into a downward pressure of the retainer 30 on the slide 56 to retain it in its slot. The increase in pressure in proportion to centrifugal force prevents the slide from being orbited out of its slot in the event of an accidental increase in the speed of rotation. The use of this alternative structure necessitates the repositioning of the electromagnet activator 38 in a position so as to pull a metal ball 68 located at the end of the link 66 inward toward the axis in order to release the pressure on the slide. No spring is required for this operation.

Figure 5:
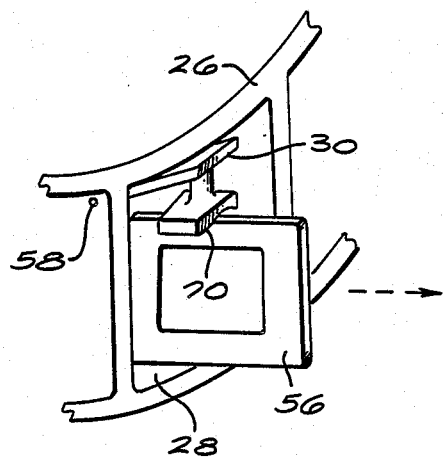
FIG. 5 shows an elevated perspective view of a storage slot with its slide being released.

FIG. 5 shows an elevated perspective view of the carousel storage slot 28 with its retainer apparatus 30 in an activated open position, and a slide 56 being propelled outward by centrifugal force from the center of rotation. The face 70 of the retainer 30 is curved to guide and secure the slide 56 in the center of its slot 28 when stored. This curvature is more pronounced at the outer edge of the face and becomes more shallow toward the inner edge (as shown by the dotted line in FIG. 3) to allow for easy reinsertion of the slide.

Figure 6:
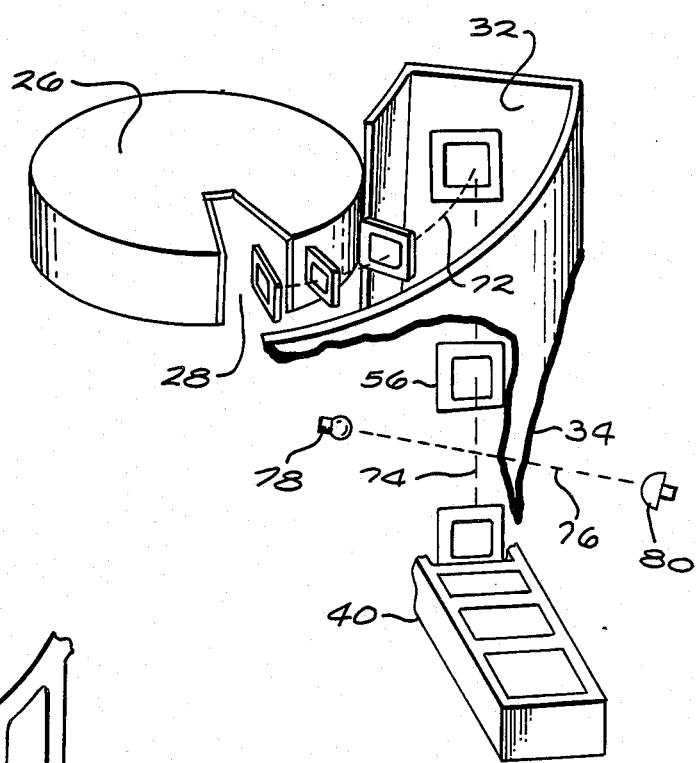
FIG. 6 shows a view of a retrieval operation tracing the path of a discharged slide from its storage slot to the collector receptacle.

FIG. 6 shows a view of a slide retrieval operation tracing the path 72, 74 of the slide 56 from its storage slot 28 to the collector receptacle 40. When the desired slot is in the correct radial position the electromagnet is actuated to provide a subsequent opening of the retainer as shown in FIG. 5. The centrifugal force created by the high speed rotation of the carousel-cylinder assembly causes the slide 56 to be rapidly flung out from the carousel 26 to follow the curved horizontal path 72. Upon hitting the inside back of the catcher 32 the lateral movement of the slide is stopped allowing the slide to change direction downward along the path 74 due to the force of gravity. The downward movement of the slide is guided by the tapered side 34 of the catcher into the waiting collection receptacle 40.

In a plane perpendicular to the path 74 a beam of light 76 is emitted by a light source 78 to imping on an optical detector 80. Both the light source 78 and the detector 80 are mounted inside the horizontal collar on opposing sides. Two openings in the catcher unit 32 allow the light beam 76 to pass through the path 74. The optical detector 80 verifies the successful retrieval of a slide when the light beam 76 is interrupted by the passage of a slide along path 74. The collector receptacle 40 may be positioned by electro-mechanical means, so as to receive the slides in adjacent locations, as they are discharged from the throat of the catcher 32. Alternatively, a stationary open tray or other box-like structure may be employed as a collector receptacle 40.

Figure 7:
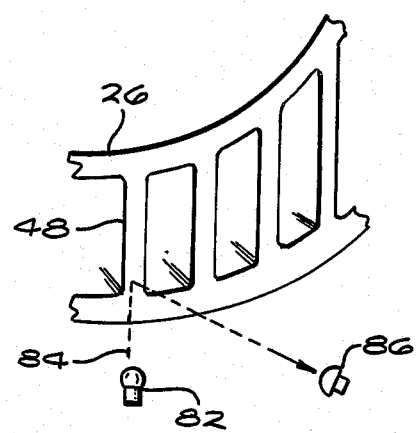
FIG. 7 shows an elevated view of the bottom slide carousel and the use of an optical detector to read radial position.

FIG. 7 shows an elevated view of the bottom slide carousel. A lamp or similar light source 82 is located below the bottom disk of 26 and is mounted inside the motor housing. An opening in the motor housing allows a beam of light 84 to illuminate the bottom portion of the carousel 26. The carousel unit 26 may be constructed of clear plastic material which causes the light to be transmitted and concentrated within the separators 48 as they pass overhead. A passive optical detector 86, mounted at the junction of the horizontal collar 44 and the verticle tube 46 (see FIG. 1), measures an increased light intensity each time a separator passes in front of it. These changes alow the radial position of the slots to be counted and used as described in the discussion of FIG. 8.

Figure 8:
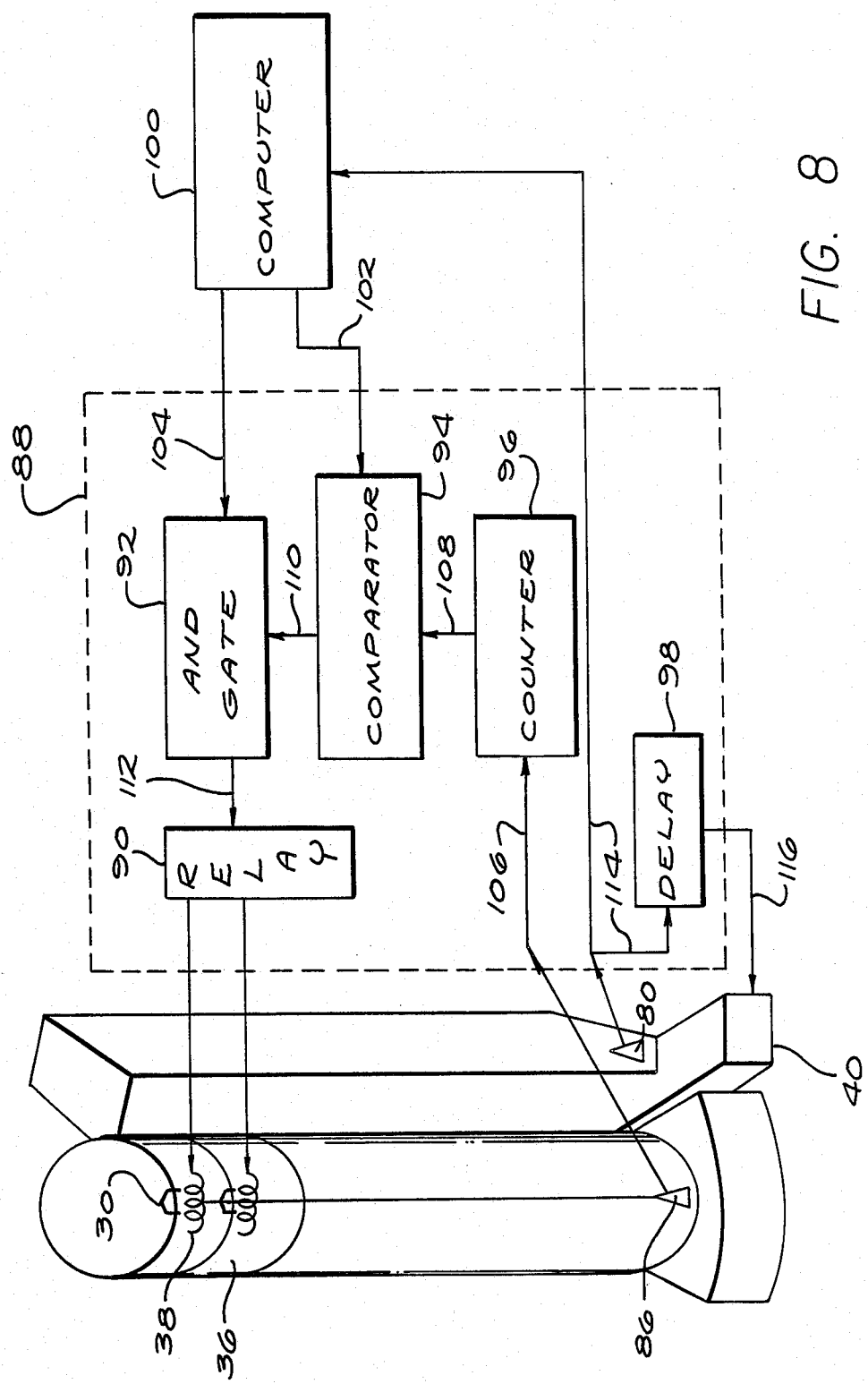
FIG. 8 shows a functional diagram of the control system for slide location, release, and retrieval verification.

FIG. 8 shows a functional diagram of the control system for slide location, release and retrieval verification (including collector repositioning). The control system is formed by the printed circuit card 88 which contains the electronic control circuitry, and is mounted within the horizontal collar 44 at the location shown in FIG. 1. The circuitry is comprised of a relay 90 for each carousel unit, an AND gate 92, a comparator 94, a counter 96 and a delay 98. The slide retrieval operation is initiated by a signal from a microcomputer 100 or like device requesting a slide in terms of its radial position 102 and tier position 104. The carousels radial position is captured by the detector 86, which provides pulses 106 to the counter 96. The counter 96 passes the measured radial address 108 to the comparator 94. At the time the two radial position addresses 102 and 108 match, the comparator 94 sends a match signal 110 to the AND gate 92. The AND gate provides a signal 112 to close the relay 90 associated with the desired tier as indicated by 104. The closure of the relay energizes the electromagnet 38 which opens the slide retainer apparatus 30. When the slide has been successfully retrieved, the optical detector 80 shown in FIG. 6, provides a verify pulse signal 114. The signal 114 is sent to the delay circuit 98. The delayed signal 116 from delay 98 is used to activate means to reposition the collector receptacle 40. The verify signal 114 is also directed to the microcomputer 100 to indicate that the control unit is ready to receive the address 102, 104 of the next slide to be retrieved.

While I have shown and described a specific embodiment of my invention for a specific use I do not limit myself to this. The operation as previously described may be used for example in an assembly take where a nonmanual parts selection and subsequent gravity insertion into a larger assembly or object is part of a production process. Although the present invention has been described in relation to slides it is also applicable to stored solid objects of different forms; for example, stiff cards, video cassettes, tape cartridges, floppy disks, pill boxes, books, wafers, etc.

Although the invention has been described with reference to a particular embodiment, it is to be appreciated that various adaptations and modifications may be made and the invention is only to be limited by the appended claims.

I claim:

1. An apparatus for storage and radial discharge of selected like items, including, A rotary storage device for storing a plurality of the selected like items at individual radial positions and with rotation of the storage device about a central axis providing for positioning of individual ones of the stored items for propelling outwardly individual ones of the stored items by centrifugal force as the storage device rotates about the central axis, a plurality of retainer means individually coupled to individual ones of the plurality of stored items and with each retainer means each including a first position to retain a stored item and a second position to release a stored item, a retrieval mechanism to trigger individual ones of the retainer means to release individual ones of the stored items, a catcher to interupt the propelled items along a substantially horizontal path and to direct the caught items along a substantially vertical path into a collector device, and a controller responsive to the location of individual ones of the stored items for controlling the retrieval mechanism to trigger the proper retainer means to allow the desired item to be released and propelled.

2. The invention defined in claim 1 wherein the selected like items are of like size and weight.

3. The invention defined in claim 1 wherein the retainer means prevents outward movement of the stored items from the center of the storage device.

4. The invention defined in claim 3 additionally including means for lifting the retainer means away from the rotational axis of the storage device to permit selected items to be propelled into a generally tangential direction.

5. The invention defined in claim 3 wherein the retainer means translates gravitational and centrifugal force to increase the retaining force in proportion to centrifugal force to prevent the stored item from being propelled in the event of an accidental increase of the speed of rotation of the storage device.

6. The invention defined in claim 1 wherein the like items are slides.

7. The invention defined in claim 1 including a plurality of rotary storage devices, stacked one on top to the other.

8. The invention defined in claim 1 wherein the collector device is progressively moved so that the propelled items are collected progressively.

9. The invention defined in claim 1 additionally including means to verify the propelling of individual ones of the stored items.

* * * * *